(12) United States Patent
Rofougaran

(10) Patent No.: US 8,509,707 B2
(45) Date of Patent: *Aug. 13, 2013

(54) WIRELESS COMMUNICATIONS DEVICE, GAMING CONTROLLER AND INTEGRATED CIRCUITS WITH MILLIMETER WAVE TRANSCEIVER AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1635 days.

This patent is subject to a terminal disclaimer.

(21) Appl. No.: 11/945,867

(22) Filed: Nov. 27, 2007

(65) Prior Publication Data

US 2009/0137317 A1 May 28, 2009

(51) Int. Cl.
| | |
|---|---|
| H04B 7/00 | (2006.01) |
| H04B 1/38 | (2006.01) |
| H04B 1/00 | (2006.01) |
| H04M 1/00 | (2006.01) |
| H03G 3/20 | (2006.01) |
| H03F 1/26 | (2006.01) |
| H03F 1/30 | (2006.01) |
| G09G 5/00 | (2006.01) |
| G06F 3/02 | (2006.01) |
| G06F 13/00 | (2006.01) |
| H04W 4/00 | (2009.01) |
| H04K 1/10 | (2006.01) |
| H04K 1/02 | (2006.01) |
| H04L 27/28 | (2006.01) |
| H04L 25/03 | (2006.01) |
| H04L 25/49 | (2006.01) |

(52) U.S. Cl.
USPC ......... 455/73; 455/41.2; 455/552.1; 455/557; 330/129; 330/149; 345/156; 345/168; 370/313; 370/328; 370/331; 370/338; 375/146; 375/260; 375/296; 710/100; 710/304

(58) Field of Classification Search
USPC .................... 455/41.1, 41.2, 53.1, 73, 75, 76, 455/77, 101, 102, 103, 118, 127.3, 127.4, 455/132, 168.1, 403, 414.2, 419, 452, 500, 455/552.1, 553.1, 557; 257/531, 601, 728; 370/277, 278, 280, 281, 311, 313, 314, 318, 370/319, 328, 329, 347, 465, 466, 467, 469; 438/51, 305; 465/37, 39
See application file for complete search history.

(56) References Cited

U.S. PATENT DOCUMENTS

| | | | | |
|---|---|---|---|---|
| 4,041,389 | A * | 8/1977 | Oades | 455/17 |
| 6,233,436 | B1 * | 5/2001 | Dent | 455/114.2 |

(Continued)

*Primary Examiner* — Yuwen Pan
*Assistant Examiner* — Paul P Tran
(74) *Attorney, Agent, or Firm* — Garlick & Markison; Bruce E. Stuckman

(57) ABSTRACT

An integrated circuit includes a millimeter wave transceiver section that is coupled to generate a first modulated RF signal from a first outbound symbol stream and to convert a first inbound RF signal into a first inbound symbol stream. A wireless transceiver section is coupled to generate a second modulated RF signal from a second outbound symbol stream and to convert a second inbound RF signal into a second inbound symbol stream. A processing module is coupled to convert first outbound data into the first outbound symbol stream, convert second outbound data into the second outbound symbol stream, convert the first inbound symbol stream into first inbound data, and to convert the second inbound symbol stream into second inbound data.

20 Claims, 8 Drawing Sheets

(56) References Cited

U.S. PATENT DOCUMENTS

| | | | |
|---|---|---|---|
| 6,430,213 B1* | 8/2002 | Dafesh | 375/146 |
| 7,062,293 B2* | 6/2006 | Johnson et al. | 455/561 |
| 7,133,646 B1* | 11/2006 | Miao | 455/73 |
| 7,197,291 B2* | 3/2007 | Mach et al. | 455/303 |
| 2005/0186986 A1* | 8/2005 | Hansen et al. | 455/553.1 |
| 2006/0084504 A1* | 4/2006 | Chan et al. | 463/39 |
| 2006/0264210 A1* | 11/2006 | Lovberg et al. | 455/422.1 |
| 2007/0232358 A1* | 10/2007 | Sherman | 455/560 |
| 2008/0108352 A1* | 5/2008 | Montemurro et al. | 455/437 |
| 2009/0097590 A1* | 4/2009 | McCallister et al. | 375/296 |
| 2010/0019827 A1* | 1/2010 | Tamura et al. | 327/403 |

* cited by examiner

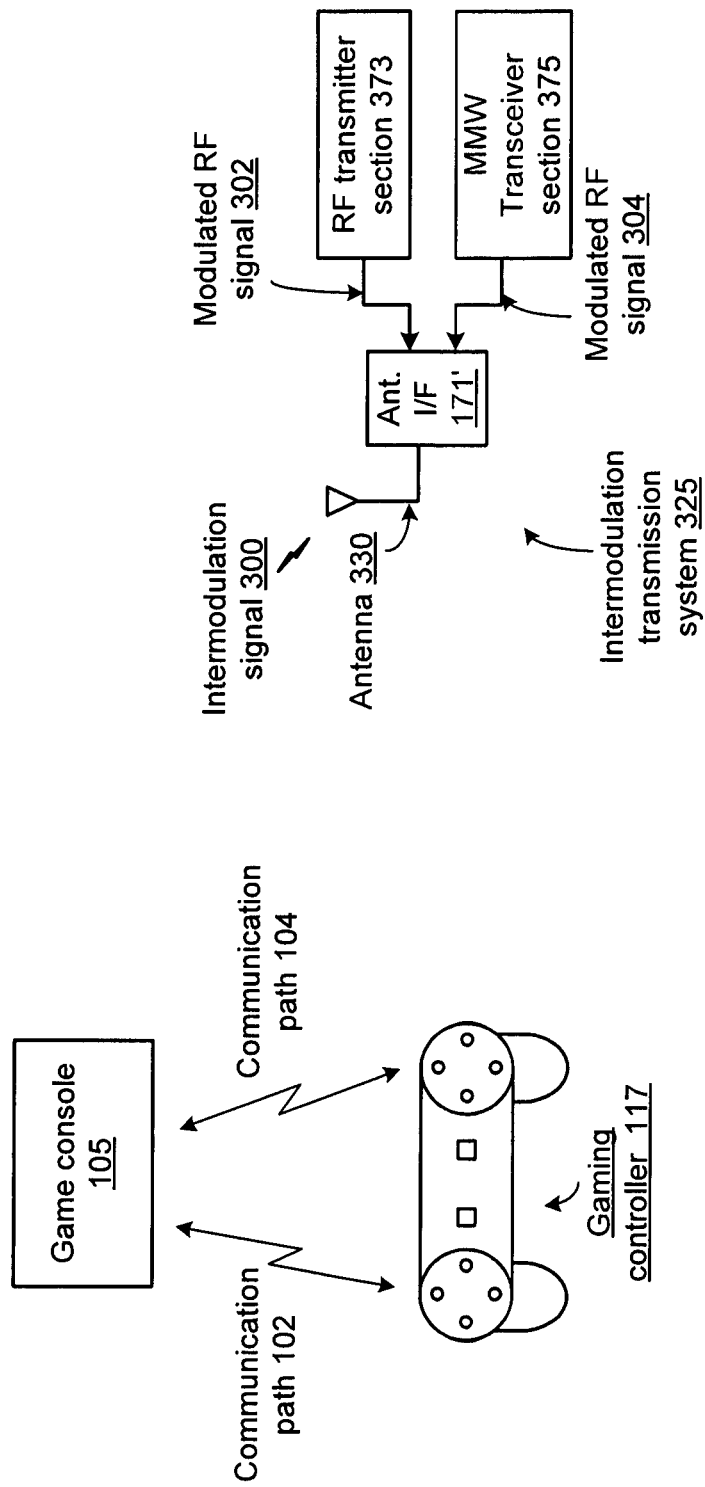

WIRELESS COMMUNICATIONS DEVICE, GAMING CONTROLLER AND INTEGRATED CIRCUITS WITH MILLIMETER WAVE TRANSCEIVER AND METHODS FOR USE THEREWITH

CROSS-REFERENCE TO RELATED APPLICATIONS

Not applicable

BACKGROUND OF THE INVENTION

1. Technical Field of the Invention

This invention relates generally to mobile communication devices, digital television receivers and more particularly to RF integrated circuit for use therein.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 7 is a pictorial representation of a game console 105 and gaming controller 117 in accordance with an embodiment of the present invention.

FIG. 8 is a schematic block diagram of an embodiment of intermodulation transmission system 325 in accordance with the present invention.

DETAILED DESCRIPTION OF THE INVENTION

Figure 1:
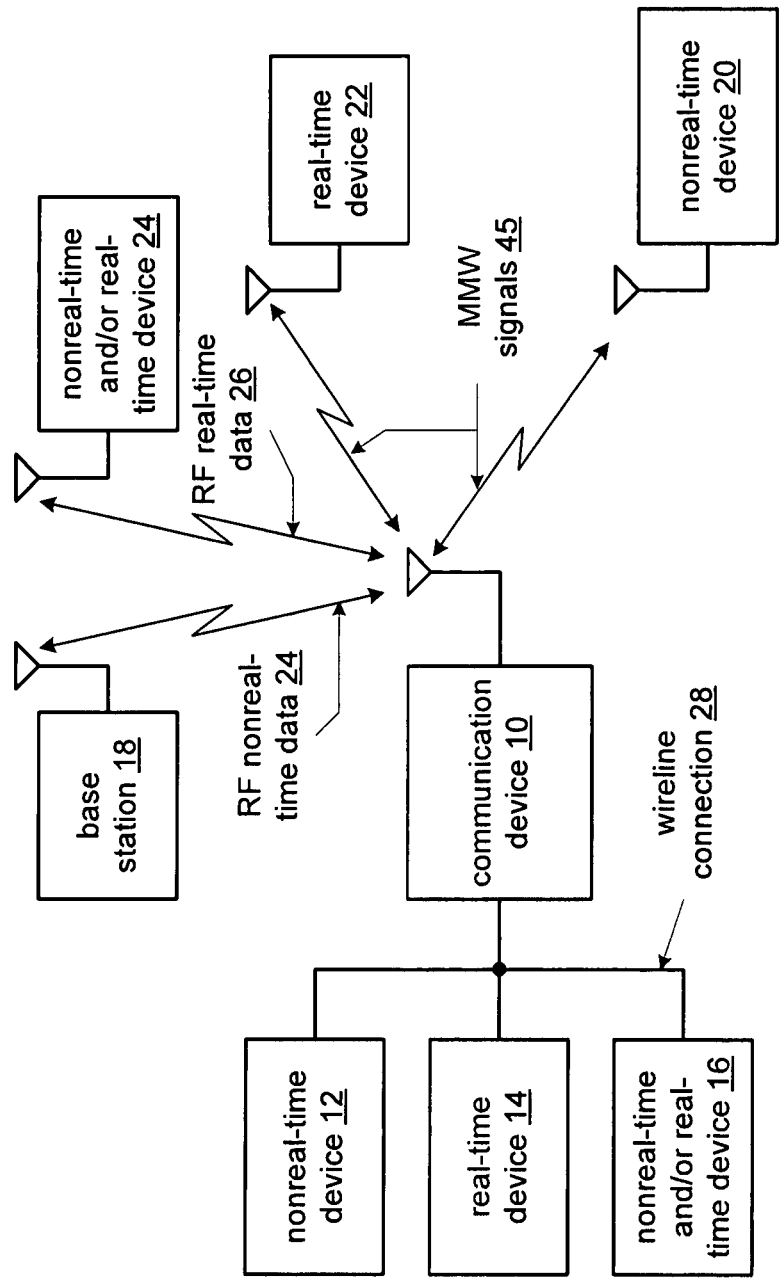
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and non-real-time data 26 wirelessly with one or more other devices such as base station 18, and non-real-time and/or real-time device 24, and that communicates millimeter wave signals 45 with non-real-time device 20 and real-time device 22. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary and receive digital television (DTV) data such as Digital Broadcast Video-Handheld (DVB-H), Digital Broadcast Video-Satellite Handheld (DVB-SH), Digital Media Broadcasting (DMB), and position data such as Global Positioning System (GPS) data. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, game device, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 24 can be personal computers, laptops, PDAs, mobile phones, such as cellular telephones, devices equipped with wireless local area network or Bluetooth transceivers, millimeter wave transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, IP television, digital television, navigation, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes an integrated circuit, such as an RF integrated circuit that includes one or more features or functions of the present invention. Such integrated circuits shall be described in greater detail in association with FIGS. 3-9 that follow.

Figure 2:
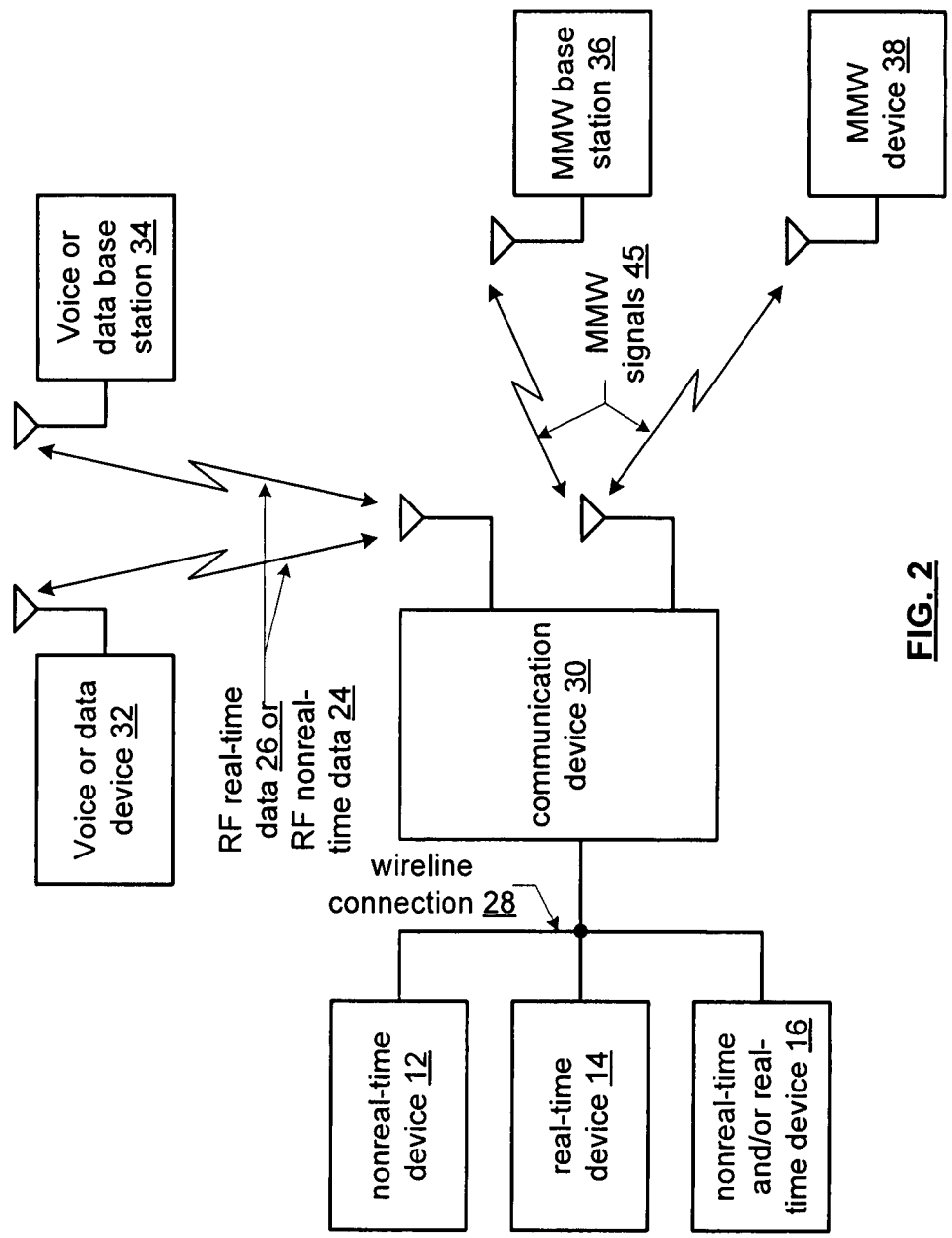
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many similar elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes one or more wireless transceivers with separate antennas for communicating via RF real-time data 24 and/or RF non-real-time data 26 with voice or data device 32 and/or voice or data base station 34 and via millimeter wave signals 45 with base station 36 and/or device 38. In particular, millimeter wave signals 45 can include real-time or non-real time data in a 60 GHz frequency band or other millimeter wave frequency band in accordance with an RFID protocol, or other wireless communication protocol.

Figure 3:
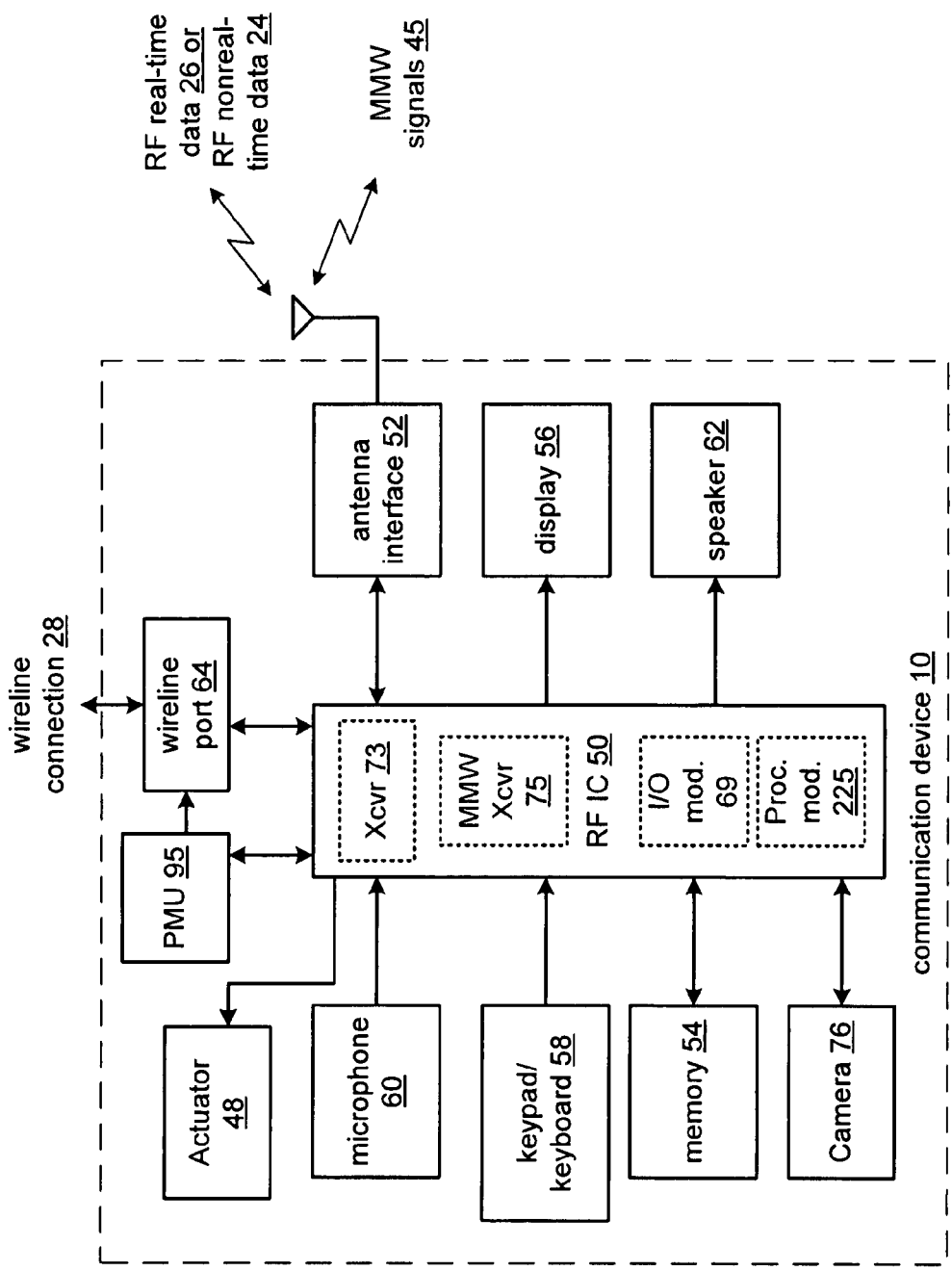
FIG. 3 is a schematic block diagram of an embodiment of a communication device 10 in accordance with the present invention.

FIG. 3 is a schematic block diagram of an embodiment of an integrated circuit in accordance with the present invention. In particular, an RF integrated circuit (IC) 50 is shown that implements communication device 10 in conjunction with microphone 60, keypad/keyboard 58, memory 54, speaker 62, display 56, camera 76, antenna interface 52 and wireline port 64. RF IC 50 includes a wireless transceiver 73 for transmitting and receiving RF real-time data 26 and non-real-time data 24 via an antenna interface 52 and antenna such as fixed antenna a single-input single-output (SISO) antenna, a multi-input multi-output (MIMO) antenna, a diversity antenna system, an antenna array or other antenna configuration. In addition, RF IC 50 includes input/output module 69 that includes the appropriate interfaces, drivers, encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Power management circuit (PMU) 95 includes one or more DC-DC converters, voltage regulators, current regulators or other power supplies for supplying the RF IC 50 and optionally the other components of communication device 10 and/or its peripheral devices with supply voltages and or currents (collectively power supply signals) that may be required to power these devices. Power management circuit 95 can operate from one or more batteries, line power, an inductive power received from a remote device, a piezoelectric source that generates power in response to motion of the integrated circuit and/or from other power sources, not shown. In particular, power management module can selectively supply power supply signals of different voltages, currents or current limits or with adjustable voltages, currents or current limits in response to power mode signals received from the RF IC 50. While shown as an off-chip module, PMU 95 can alternatively be implemented as an on-chip circuit.

RF IC 50 also includes a millimeter wave transceiver 75 that sends and receives millimeter wave data 45. In operation RF IC 50, a millimeter wave transceiver section of millimeter wave transceiver 75 is coupled to generate a modulated RF signal from a first outbound symbol stream and convert an inbound RF signal, included in millimeter wave signals 45, into an inbound symbol stream. A wireless transceiver section of RF transceiver 73, generates another modulated RF signal from a second outbound symbol stream and converts an inbound RF signal, included in RF real-time data 26 or RF non-real-time data 24 into another inbound symbol stream. A processing module, such as processing module 225 or a processor associated with either RF transceiver 73 or millimeter wave transceiver 75, converts first outbound data into the first outbound symbol stream, converts second outbound data into the second outbound symbol stream, converts the first inbound symbol stream into first inbound data, and that converts the second inbound symbol stream into second inbound data. The first inbound signal can be formatted in accordance with a wireless local area network protocol, a wireless piconet protocol, a wireless telephony protocol or other protocol for communicating real-time or non-real-time data.

In an embodiment of the present invention, the processing module executes an application, such as a real-time or non-real-time application that generates the first outbound data as low data rate data and generates the second outbound data as high data rate data. In this fashion, the millimeter wave transceiver 75 transmits and receives the low data rate data while the RF transceiver 73 transmits and receives the high data rate data. The processing module 225 can control when each of the transceivers 73 and 75 transmit. In particular, processing module 225 can command the millimeter wave transceiver section and the wireless transceiver section to transmit serially by either assigning time slots or other time periods for one or the other transceiver to transmit, or by controlling one or another of the transceivers 73, 75 not to transmit while the other transceiver is transmitting. In a further embodiment, millimeter wave transceiver section and the wireless transceiver section can operate in parallel, or in circumstances where transmission is accomplished via intermodulation, both transceivers are controlled to transmit contemporaneously.

In an embodiment of the present invention, the antenna interface 52 is coupled to a combined antenna that transmits the millimeter wave signals 45 and the RF real-time data 26 and RF non-real-time data 24 via intermodulation. In particular, a nonlinear element in the antenna or antenna interface 52 generates a modulation product at the carrier frequency of either the millimeter wave signals 45 or the RF real-time data 26 and RF non-real-time data 24. In operation, this nonlinear element generates a modulation product, such as a modulation cross-product between either the fundament or harmonics of either the RF real-time data 26 and RF non-real-time data 24 the RF real-time data 26 and RF non-real-time data 24, or a higher order product such as the $2^{nd}$, $3^{rd}$, $4^{th}$ or higher harmonic of either the RF real-time data 26 and RF non-real-time data 24. For example, consider the case where the millimeter wave signals 45 operate with a 60 GHz carrier frequency and RF transceiver 73 transmits at a 2.4 GHz carrier frequency. The combined antenna and antenna interface 52 can generate an outbound RF signal from a 2.4 GHz modulated signal from the RF transceiver 73 and at 60 GHz based on the $7^{th}$ harmonic of a 8.57 GHz modulated signal from the millimeter wave transceiver 75. In a further example a cross-product between the modulated signal from the RF transceiver 73 and the modulated signal from the millimeter wave transceiver 75 or either or their respective harmonics can be used for generating either the 60 GHZ outbound RF signal or the 2.4 GHz outbound RF signal.

While the outbound RF signals are described above as being generated via intermodulation, in the alternative, traditional modulation can be used to directly generate the outbound RF signal corresponding directly to the transmitted millimeter wave signals 45 can be generated directly as the moduled signal of millimeter wave transceiver 75 and the outbound RF signal corresponding directly to the transmitted RF real-time data 26 and non-real-time data 24 can be generated directly as the moduled signal of RF transceiver 73.

In an embodiment of the present invention, the RF IC 50 is a system on a chip integrated circuit that includes at least one processing device. Such a processing device, for instance, processing module 225, may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In further operation, the RF IC 50 executes operational instructions that implement one or more of the applications (real-time or non-real-time) attributed to communication devices 10 as discussed above and in conjunction with FIGS. 1 and 2.

Figure 4:
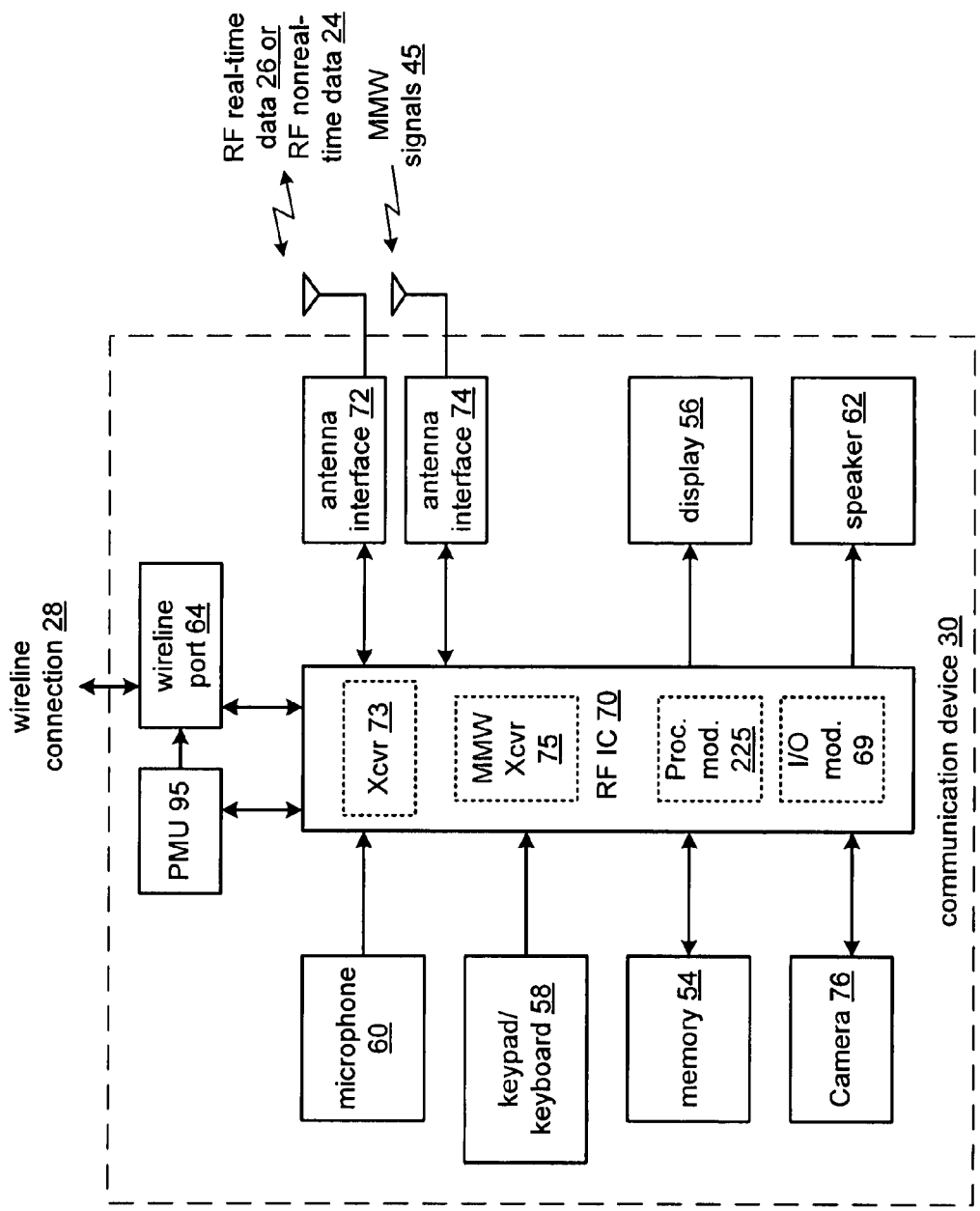
FIG. 4 is a schematic block diagram of a communication device 30 in accordance with another embodiment of the present invention.

FIG. 4 is a schematic block diagram of another embodiment of an integrated circuit in accordance with the present invention. In particular, FIG. 4 presents a communication device 30 that includes many common elements of FIG. 3 that are referred to by common reference numerals. RF IC 70 is similar to RF IC 50 and is capable of any of the applications, functions and features attributed to RF IC 50 as discussed in conjunction with FIG. 1-3. However, RF IC 70 includes separate antennas and separate antenna interfaces 72 and 74. In this configuration, a dedicated antenna and antenna interface 72 can be used for transmitting and receiving RF data 40 and RF voice signals 42 and further a dedicated antenna and antenna interface 74 can be used for transmitting and receiving millimeter wave 45. This configuration helps facilitate contemporaneous transmission by RF transceiver 73 and millimeter wave transceiver 75, however, serial transmission can nevertheless be employed in cases where transmission by one transceiver would or could interfere with transmissions by the other. In addition, transmissions by one transceiver can further be controlled by processing module 225 to avoid interference during periods of reception by the other transceiver.

As discussed in conjunction with FIG. 3, the communication device 30, such as a station set in communication with an access point, wireless telephone set that places and receives wireless calls through a wireless telephone network and/or a IP telephone system, via a base station, access point or other communication portal, a Bluetooth device that communicates over a piconet or otherwise communicates RF real-time data 26 and RF non-real-time data 24 and as well as millimeter wave data 45.

In operation, the RF IC 70 executes operational instructions that implement one or more of the applications (real-time or non-real-time) attributed to communication devices 10 and 30 as discussed above and in conjunction with FIGS. 1-3.

Figure 5:
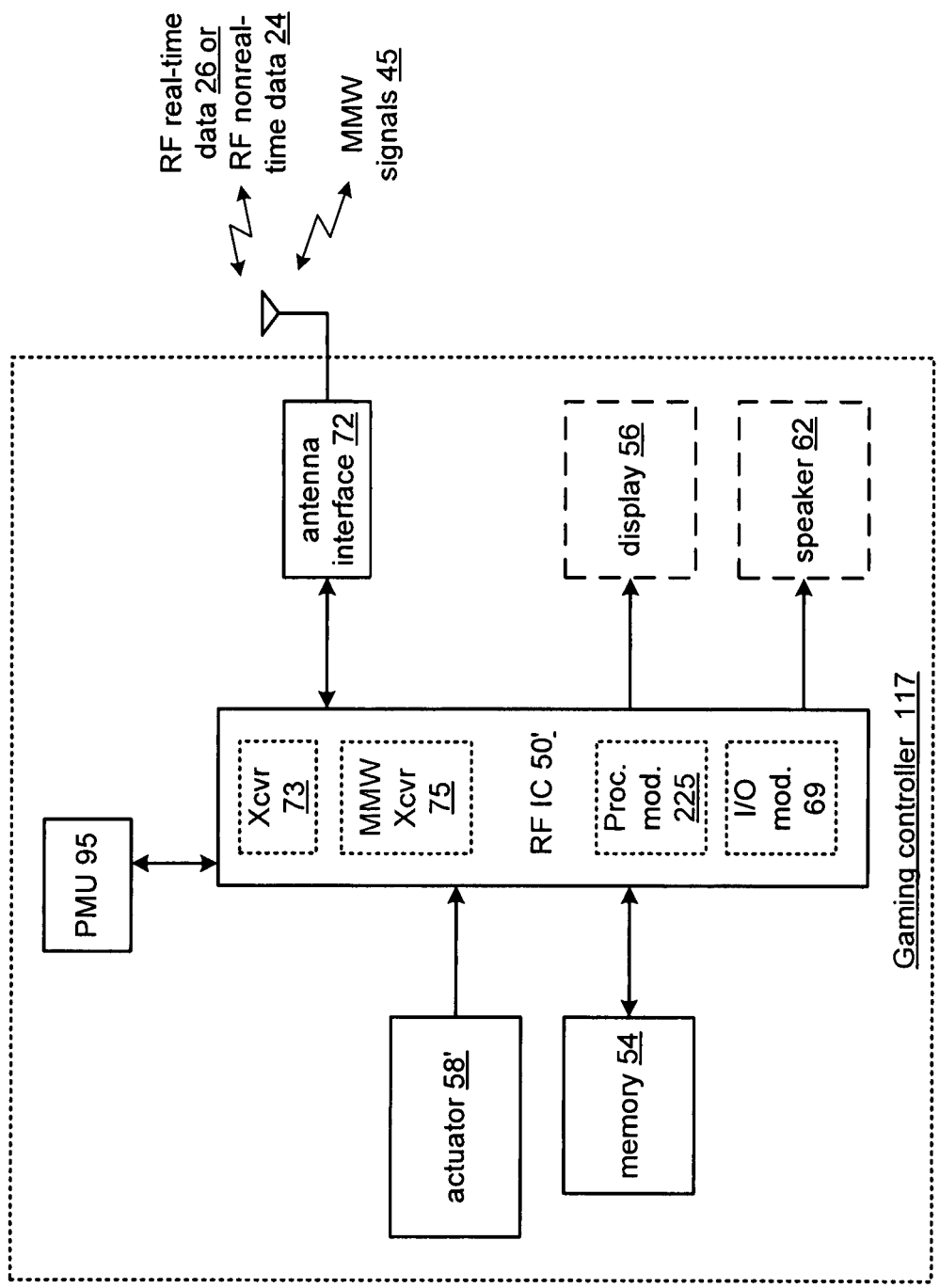
FIG. 5 is a schematic block diagram of a communication device 30' in accordance with another embodiment of the present invention.

FIG. 5 is a schematic block diagram of another embodiment of an integrated circuit in accordance with the present invention. In particular, FIG. 5 presents a gaming controller 117 that includes several common elements of FIG. 3 that are referred to by common reference numerals. RF IC 50' is similar to RF IC 50 and is capable of operating one or more gaming controller applications, and includes many of the functions and features attributed to RF ICs 50 discussed in conjunction with FIG. 3. A more general actuator 58' is included in place of keypad/keyboard 58 that generated user data in response to the actions of a user. While shown with a single antenna and antenna interface 52, in a similar fashion to RF IC 70, RF IC 50' can also include two antennas and two antenna interfaces (72 and 74) described in conjunction with FIG. 4.

Figure 6:
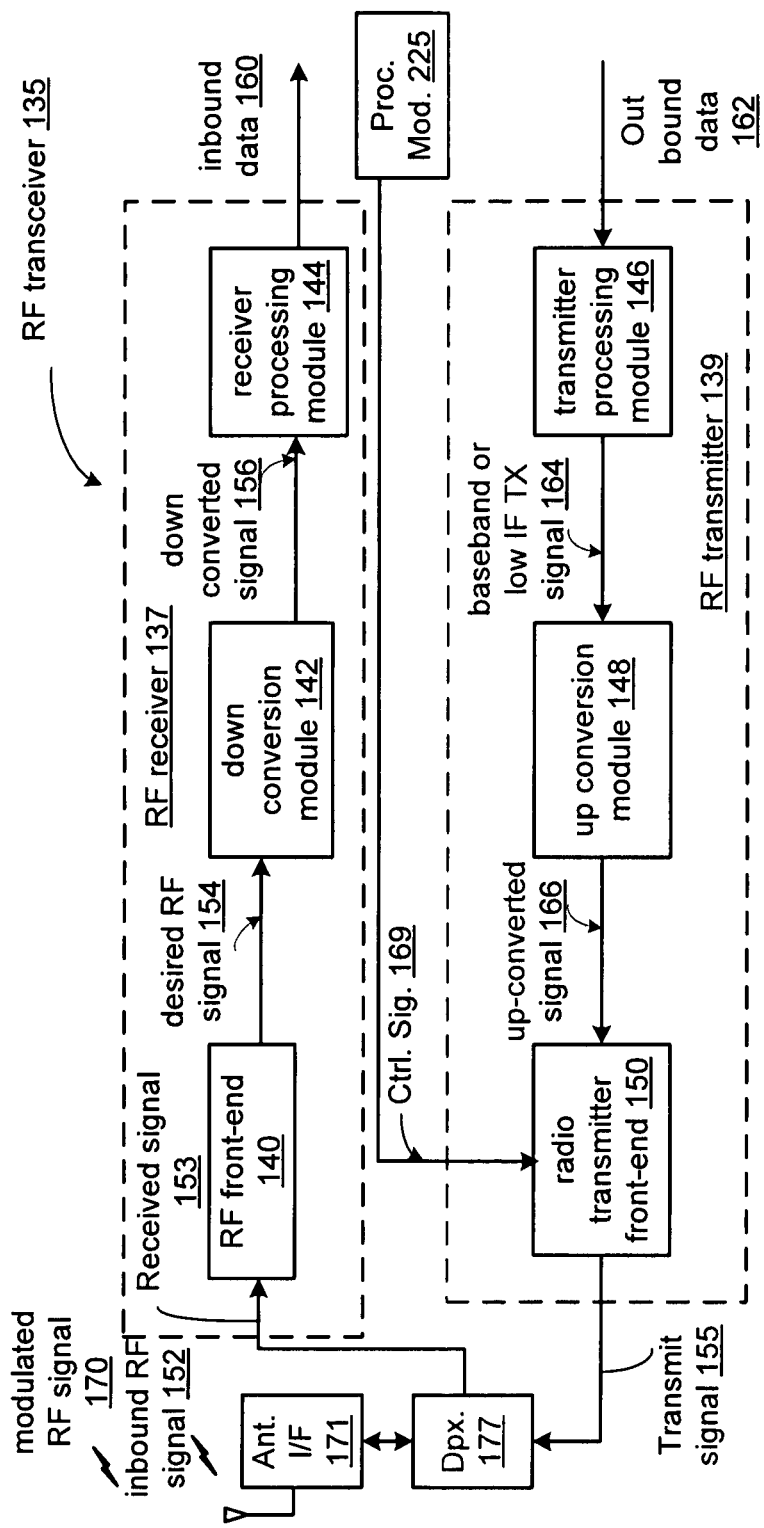
FIG. 6 is a schematic block diagram of an embodiment of RF transceiver 135 in accordance with the present invention.

FIG. 6 is a schematic block diagram of an embodiment of RF transceiver 135 in accordance with the present invention. The RF transceiver 135, such as RF transceiver 75 and/or millimeter wave transceiver 73 includes an RF transmitter 139, and an RF receiver 137. The RF receiver 137 includes a RF front end 140, a down conversion module 142 and a receiver processing module 144. The RF transmitter 139 includes a transmitter processing module 146, an up conversion module 148, and a radio transmitter front-end 150.

As shown, the receiver and transmitter are each coupled to an antenna through an off-chip antenna interface 171 and a diplexer (duplexer) 177 that function as antenna interface 72, that couples the transmit signal 155 to the antenna to produce outbound RF signal 170 and couples inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration. Also, the antenna structure of the wireless transceiver may depend on the particular standard(s) to which the wireless transceiver is compliant and the applications thereof.

In operation, the transmitter receives, via the transmitter processing module 146, outbound data 162 that includes non-realtime data or real-time data generated by an application of communication device 10, 30 or other source. In an embodiment of the present invention processing module 225 selects the outbound data 162 based on the data rate employed by the particular transceiver. For instance, processing module 225 can select the outbound data for the millimeter wave transceiver 75 as low data rate data and select the outbound data for the RF transceiver 73 as high data rate data, based on the capabilities of each respective transceiver and the communication path used therewith.

The transmitter processing module 146 processes the outbound data 162 in accordance with a particular wireless communication standard that can include a cellular data or voice protocol, a WLAN protocol, millimeter wave protocol, piconet protocol or other wireless protocol such as IEEE 802.11, Bluetooth, RFID, GSM, CDMA, et cetera) to produce baseband or low intermediate frequency (IF) transmit (TX) signals 164 that includes an outbound symbol stream that contains outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation.

The radio transmitter front end 150 includes a power amplifier and may also include a transmit filter module. The power amplifier amplifies and optionally filters the up-converted signals 166 to produce modulated RF signal 170, which may be either an outbound RF signal if coupled to a traditional antenna structure or that may be a signal that generates the outbound RF signal via intermodulation if coupled to an antenna with these capabilities. In either case, the antenna structure transmits the outbound RF signal to a targeted device such as a RF tag, base station, an access point and/or another wireless communication device via an antenna interface 171 coupled to an antenna that provides impedance matching and optional bandpass filtration.

The receiver receives inbound RF signals 152 via the antenna and off-chip antenna interface 171 that operates to process the inbound RF signal 152 into received signal 153 for the receiver front-end 140. In general, antenna interface

171 provides impedance matching of antenna to the RF front-end 140, optional bandpass filtration of the inbound RF signal 152.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156 that includes a inbound symbol stream. Note that the ordering of the ADC module and filtering and/or gain module may be switched, such that the filtering and/or gain module is an analog module.

The receiver processing module 144 processes the baseband or low IF signal 156 in accordance with a particular wireless communication standard that can include a cellular data or voice protocol, a WLAN protocol, piconet protocol or other wireless protocol such as IEEE 802.11, Bluetooth, RFID, GSM, CDMA, et cetera) to produce inbound data 160 that can include non-realtime data, realtime data an control data. The processing performed by the receiver processing module 144 can include, but is not limited to, digital intermediate frequency to baseband conversion, demodulation, demapping, depuncturing, decoding, and/or descrambling.

Processing module 225 generates control signals 169 for controlling the transmission by RF transmitter 129. For instance, RF transmitter 129 of both the RF transceiver 73 and millimeter wave transceiver 75 can be selectively activated and deactivated in response to the control signals 169. In particular, processing module 225 can control the transmission by both the RF transceiver 73 and millimeter wave transceiver 75 so that these transceivers operate serially or in parallel, or one or another of the transceivers does not transmission during a reception period, etc.

In an embodiment of the present invention, receiver processing module 144, processing module 225 and transmitter processing module 146 can be implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the these processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

When implementing integrated circuit 50, 50' or 70, two implementations of RF transceiver 135 can be included to separately implement RF transceiver 73 and millimeter wave transceiver 75. However, in accordance with an embodiment of the present invention, RF transceiver 73 and millimeter wave transceiver 75 can share one or more common elements. For instance, the receiver processing module 144 and/or transmitter processing module 146 for both devices can be implemented with a shared processing device that performs portions or all of the baseband processing for both RF transceiver 73 and millimeter wave transceiver 75.

FIG. 7 is a pictorial representation of a game console 105 and gaming controller 117 in accordance with an embodiment of the present invention. In particular, gaming controller 117 includes at least one actuator such as actuator 58' that may be a keypad, keyboard, touchpad, touch screen, joystick, button, wheel, gyrator, optical sensor or other user interface device that generates user data in response to the actions of a user. Gaming controller 117 communicates with gaming console 105 in accordance with a gaming application such as a video game application. In particular, RF real-time data 26 or RF non-real-time data 24 are communicated via communication path 102 and millimeter wave signals are communicated via communication path 104. In an embodiment of the present invention, gaming controller 117 is implemented with an integrated circuit such as RF integrated circuit 50' that includes the functions and features previously described.

In addition to the at least one actuator, gaming controller includes a millimeter wave transceiver section of a millimeter wave transceiver, such as millimeter wave transceiver 73 that generates a first modulated RF signal from a first outbound symbol stream and converts a first inbound RF signal into a first inbound symbol stream. A wireless transceiver section of an RF transceiver such as RF transceiver 75 generates a second modulated RF signal from a second outbound symbol stream and converts a second inbound RF signal into a second inbound symbol stream. A processing module, that includes receiver processing module 144 and transmitter processing module 146 converts the user data into first outbound data and second outbound data, converts the first outbound data into the first outbound symbol stream, converts the second outbound data into the second outbound symbol stream, converts the first inbound symbol stream into first inbound data, and converts the second inbound symbol stream into second inbound data.

In an embodiment of the present invention, the first inbound signal can be formatted in accordance with a wireless local area network protocol, a wireless piconet protocol, or other wireless protocol. The processing module can selects the first outbound data as low data rate data and selects the second outbound data as high data rate data. The processing module, such as processing module 225 can command the millimeter wave transceiver section and the wireless transceiver section to transmit serially or in parallel.

FIG. 8 is a schematic block diagram of an embodiment of intermodulation transmission system 325 in accordance with the present invention. An antenna 330 is coupled via antenna interface 171 to a millimeter wave transceiver section 375 and an RF transceiver section 373. In an embodiment of the present invention, the millimeter wave transceiver section 375 and the RF transceiver section 373 can be implemented with portions of the RF transceiver 135, without the baseband processing performed by receiver processing module 144 and transmitter processing module 146. Antenna 330, by itself, or through the operation of antenna interface 171' includes a nonlinear element or other nonlinearity that generates an intermodulation signal 300. This intermodulation signal 300 includes an outbound RF signal that is based on an intermodulation product of at least one of, the modulated RF signal 302 and the modulated RF signal 304. In this fashion, antenna 300 can transmit two signals in two frequency bands such as a wireless local area network band and a millimeter wave band. As discussed, it is this intermodulation product that produces a carrier for at least one of these two frequency bands, based on either a higher-order product of the modulated RF signal 302 and/or the modulated RF signal 304 and/or a cross product of the modulated RF signal 302 and the modulated RF signal 304 or any if their harmonics.

Figure 9:
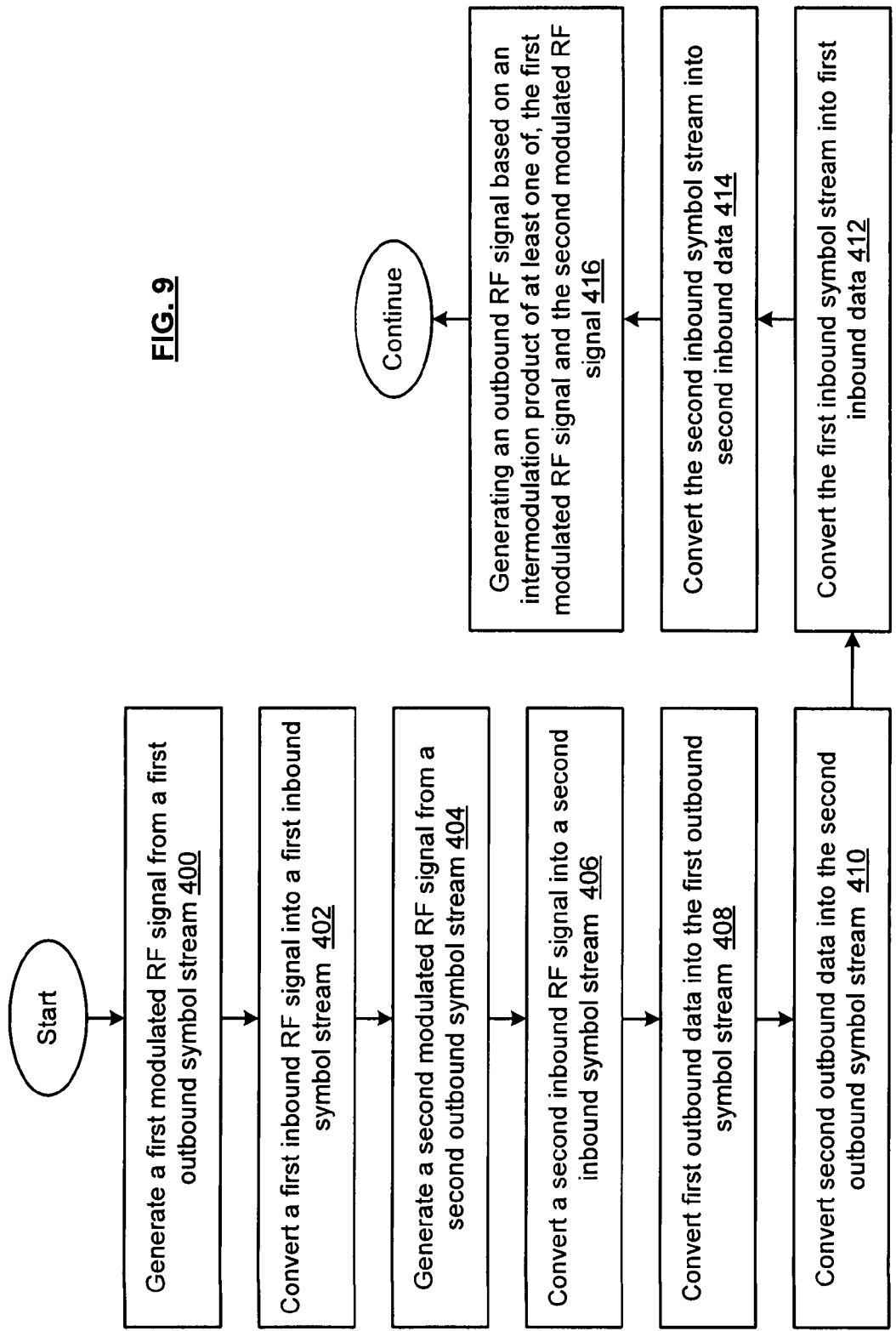
FIG. 9 is a flow chart of an embodiment of a method in accordance with the present invention.

FIG. 9 is a flow chart of an embodiment of a method in accordance with the present invention. In particular, a method is presented for use in conjunction with one or more of the functions and features described in conjunction with FIGS. 1-8. In step 400, a first modulated RF signal is generated from a first outbound symbol stream. In step 402, a first inbound RF signal is converted into a first inbound symbol stream. In step 404, a second modulated RF signal is generated from a second outbound symbol stream. In step 406, a second inbound RF signal is converted into a second inbound symbol stream. In step 408, first outbound data is converted into the first outbound symbol stream. In step 410, second outbound data is converted into the second outbound symbol stream. In step 412, the first inbound symbol stream is converted into first inbound data. In step 414, the second inbound symbol stream is converted into second inbound data. In step 416, an outbound RF signal is generated based on an intermodulation product of at least one of, the first modulated RF signal and the second modulated RF signal.

In an embodiment of the present invention, the first inbound signal is formatted in accordance with one of: a wireless local area network protocol, and a wireless piconet protocol. The first outbound data can include low data rate data and the second outbound data can include high data rate data. The intermodulation product can include a cross product of the first modulated RF signal and the second modulated RF signal and/or a high-order product of at least one of, the first modulated RF signal and the second modulated RF signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An integrated circuit comprising:
   a millimeter wave transceiver section coupled to:
      generate a first modulated RF signal from a first outbound symbol stream; and
      convert a first inbound RF signal into a first inbound symbol stream;
   a wireless transceiver section coupled to:
      generate a second modulated RF signal from a second outbound symbol stream; and
      convert a second inbound RF signal into a second inbound symbol stream; and
   a processing module coupled to:
      convert first outbound data into the first outbound symbol stream;
      convert second outbound data into the second outbound symbol stream;
      convert the first inbound symbol stream into first inbound data; and
      convert the second inbound symbol stream into second inbound data;
      wherein the processing module executes an application that generates the first outbound data as low data rate data and generates the second outbound data as high data rate data and wherein the processing module commands the millimeter wave transceiver section and the wireless transceiver section to transmit in parallel; and
      wherein the first modulated RF signal and the second modulated RF signal are generated for a combined antenna that generates a desired outbound RF signal based on an intermodulation product of at least one of, the first modulated RF signal and the second modulated RF signal.

2. The integrated circuit of claim 1 wherein the first inbound signal is formatted in accordance with one of: a wireless local area network protocol, and a wireless piconet protocol.

3. The integrated circuit of claim 1 wherein the first modulated RF signal includes a first outbound RF signal and the second modulated RF signal includes a second outbound RF signal.

4. The integrated circuit of claim 1 wherein the intermodulation product includes a cross product of the first modulated RF signal and the second modulated RF signal.

5. The integrated circuit of claim 1 wherein the intermodulation product includes a high-order product of at least one of, the first modulated RF signal and the second modulated RF signal.

6. A gaming controller comprising:
    an actuator that generates user data based on actions of a user;
    a millimeter wave transceiver section coupled to:
        generate a first modulated RF signal from a first outbound symbol stream; and
        convert a first inbound RF signal into a first inbound symbol stream;
    a wireless transceiver section coupled to:
        generate a second modulated RF signal from a second outbound symbol stream; and
        convert a second inbound RF signal into a second inbound symbol stream; and
    a processing module coupled to:
        convert the user data into first outbound data and second outbound data
        convert the first outbound data into the first outbound symbol stream;
        convert the second outbound data into the second outbound symbol stream;
        convert the first inbound symbol stream into first inbound data; and
        convert the second inbound symbol stream into second inbound data;
        wherein the processing module executes an application that generates the first outbound data as low data rate data and generates the second outbound data as high data rate data and wherein the processing module commands the millimeter wave transceiver section and the wireless transceiver section to transmit in parallel; and
    an antenna, coupled to the millimeter wave transceiver section and the wireless transceiver section, that generates a desired outbound RF signal based on an intermodulation product of at least one of, the first modulated RF signal and the second modulated RF signal.

7. The gaming controller of claim 6 wherein the first inbound signal is formatted in accordance with one of: a wireless local area network protocol, and a wireless piconet protocol.

8. The gaming controller of claim 6 wherein the first modulated RF signal includes a first outbound RF signal and the second modulated RF signal includes a second outbound RF signal.

9. The gaming controller of claim 6 wherein the intermodulation product includes a cross product of the first modulated RF signal and the second modulated RF signal.

10. The gaming controller of claim 6 wherein the intermodulation product includes a high-order product of at least one of, the first modulated RF signal and the second modulated RF signal.

11. A method comprising:
    generating a first modulated RF signal from a first outbound symbol stream; and
    converting a first inbound RF signal into a first inbound symbol stream;
    generating a second modulated RF signal from a second outbound symbol stream in parallel with the generation of the first modulated RF signal;
    converting a second inbound RF signal into a second inbound symbol stream;
    converting first outbound data into the first outbound symbol stream;
    converting second outbound data into the second outbound symbol stream;
    converting the first inbound symbol stream into first inbound data;
    converting the second inbound symbol stream into second inbound data; and
    generating a desired outbound RF signal based on an intermodulation product of at least one of, the first modulated RF signal and the second modulated RF signal.

12. The method of claim 11 wherein the first inbound signal is formatted in accordance with one of: a wireless local area network protocol, and a wireless piconet protocol.

13. The method of claim 11 wherein the first outbound data includes low data rate data and the second outbound data includes high data rate data.

14. The method of claim 11 wherein the intermodulation product includes a cross product of the first modulated RF signal and the second modulated RF signal.

15. The method of claim 11 wherein the intermodulation product includes a high-order product of at least one of, the first modulated RF signal and the second modulated RF signal.

16. The method of claim 11 wherein the desired outbound RF signal is generated via a combined antenna.

17. The method of claim 11 wherein the intermodulation product is generated via a combined antenna.

18. The method of claim 11 wherein the first modulated RF signal is generated via a millimeter wave transceiver.

19. The method of claim 11 wherein the second modulated RF signal is generated via a non-millimeter wave transceiver.

20. The method of claim 11 wherein the second modulated RF signal is generated via a wireless local area network transceiver.

* * * * *